(No Model.)
J. P. LEWIS.
TOOL FOR CUTTING AND BURNISHING.
No. 369,252. Patented Aug. 30, 1887.
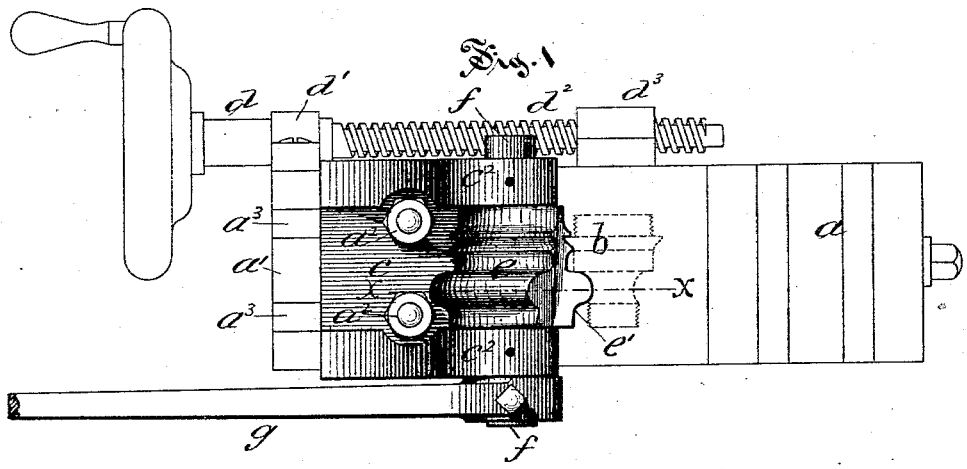
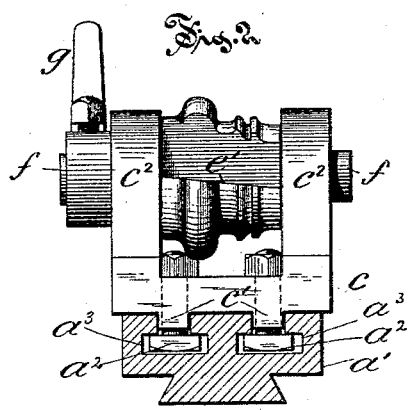
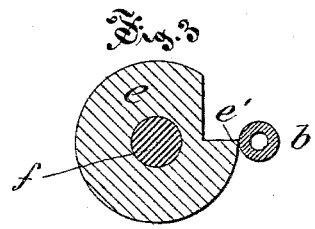 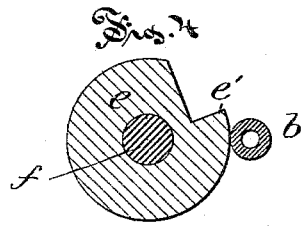
Witnesses:
W. M. Bjorkman
H. R. Williams
Inventor:
Justus P. Lewis,
by Simonds & Burdett,
attys.

UNITED STATES PATENT OFFICE.

JUSTUS P. LEWIS, OF HARTFORD, CONNECTICUT, ASSIGNOR OF ONE-HALF TO THE PRATT & CADY COMPANY, OF SAME PLACE.

TOOL FOR CUTTING AND BURNISHING.

SPECIFICATION forming part of Letters Patent No. 369,252, dated August 30, 1887.

Application filed October 4, 1886. Serial No. 215,213. (No model.)

*To all whom it may concern:*

Be it known that I, JUSTUS P. LEWIS, of Hartford, in the county of Hartford and State of Connecticut, have invented certain new and useful Improvements in Cutting and Burnishing Tools for Lathes, of which the following is a full, clear, and exact description, whereby any one skilled in the art can make and use the same.

The object of my invention is to provide a tool that will lessen the labor of shaping metallic bodies having bounding-surfaces made up in part of cylindrical forms and irregular profile; and to this end my improvement consists in a tilting tool that is circular in cross-section with a cutting-lip inclined to the axis of the bearings of the tool and having the back of the lip full and formed on the curve of movement of the lip, and in details of the device, as more particularly hereinafter described, and pointed out in the claims.

Referring to the drawings, Figure 1 is a plan view of a lathe-carriage on which is mounted a sliding standard bearing my improved tool. Fig. 2 is a front view in elevation of the standard. Fig. 3 is a view in cross-section of the tool and the work on plane $xx$ of Fig. 1, the former being in position as when cutting. Fig. 4 is a similar cross-sectional view of the same parts, showing the position of the tool when burnishing.

In the accompanying drawings, the letter $a$ denotes the carriage of a lathe, and $b$ a piece of work indicated in dotted outline and held in any convenient manner between the centers, the spindles and chuck not being shown. On the upper and movable part, $a'$, of this carriage is secured, by means of bolts and nuts, the tool-standard $c$, the base of which has on its under side the lugs $c'$, that take into grooves $a^3$ in the top part of the carriage, that is movable toward and from the lathe-spindles by means of a feed-screw, $d$. The shank of this screw $d$ is secured to the upper part of the carriage by a collar on the bracket $d'$, fast to this upper part, and this collar permits rotation, but prevents any lengthwise play of the screw, the threaded end $d^2$ of which takes into a nut, $d^3$, fast to the carriage $a$. The grooves $a^3$ on the top of the carriage are dovetailed or L-shaped, and the heads of the bolts $a^2$ lie in the grooves with their edges under the flanges, and thus, while allowing the standard to be moved along the carriage to adjust it to work of various diameter, hold it securely when clamped.

In the vertical arms $c^2$ of the standard the tool-body $e$ is supported on a pivot-pin, $f$, that lies about parallel to the axis of the lathe-centers. This tool-body is preferably cylindrical, with a profile conforming to that of the work in parts to be cut by a cutting-lip, $e'$, that is formed by grinding away a partial segment of the body, leaving the lip at an angle with the axis of the pivot-pin. The result of this construction is that the cutting action of the lip does not begin at the same moment along the length of the work, but is continuous as the cutter-body is rotated. This rotation or rocking movement of the tool-body is effected preferably by means of the lever-handle $g$, that is secured to the pivot-pin, to which the tool-body is also secured.

A peculiarity of the cutter-body is that it is not relieved back of the lip $e'$, but is full and conforms to the curve formed by the circular movement of the lip as the cutter-body is rotated. The advantage of this construction is that after the cutting-lip $e'$ has cut the work to proper outline the surface of this work may be then burnished by the full surface $e^2$ back of the lip. As the cutting-lip becomes dull it is sharpened, as by grinding, and the circular form of the cutter-body permits this to be done many times before the whole body is so cut away as to become useless.

My improved tool is particularly adapted for use in shaping the bodies of cocks and valves, and the cap of a fluid-cock is shown in dotted outline in Fig. 1.

Prior to my invention such a cap was cast to general shape, next secured in a chuck in a lathe, and the thread cut on the larger end. It was then removed, chucked again, and the thread cut on the small end. It was again removed, then chucked and roughed out, and was again removed, rechucked, and finished.

By means of my improved tool the three last operations are performed in one chucking.

I claim as my improvement—

1. An improved cutting and burnishing tool consisting of a rotary tool-body with a cutting-lip inclined to the axis of the bearings of the tool and having the back of the cutting-lip full and formed on the curve described by the movement of the lip in cutting, in combination with the lever or like device attached to the cutter-body, and whereby it may be tilted, all substantially as described.

2. In combination, the carriage with the movable upper part, $a'$, the feed-screw $d$, the tool-standard $c$, secured to the carriage-top and supporting the pivot-pin $f$, the cutter-body $e$, with cutting-lip $e'$, and fast to the pivot-pin, and the lever-handle, also fast to the pin, all substantially as described.

3. An improved cutting and burnishing tool consisting of a rotary or tilting tool-body having a cutting-lip and that is full back of the lip, in combination with means for tilting the cutter-body.

JUSTUS P. LEWIS.

Witnesses:
CHAS. L. BURDETT,
ERNEST CADY.